(12) United States Patent
Steil

(10) Patent No.: US 10,665,911 B2
(45) Date of Patent: May 26, 2020

(54) BATTERY MODULE

(71) Applicant: Robert Bosch GmbH, Stuttgart (DE)

(72) Inventor: Michael Steil, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 846 days.

(21) Appl. No.: 15/034,195

(22) PCT Filed: Oct. 23, 2014

(86) PCT No.: PCT/EP2014/072698
§ 371 (c)(1),
(2) Date: May 4, 2016

(87) PCT Pub. No.: WO2015/062945
PCT Pub. Date: May 7, 2015

(65) Prior Publication Data
US 2016/0276720 A1    Sep. 22, 2016

(30) Foreign Application Priority Data

Nov. 4, 2013  (DE) .......................... 10 2013 222 293

(51) Int. Cl.
*H01M 10/63*    (2014.01)
*H01M 10/647*   (2014.01)
(Continued)

(52) U.S. Cl.
CPC ............. *H01M 10/63* (2015.04); *H01M 2/10* (2013.01); *H01M 10/482* (2013.01);
(Continued)

(58) Field of Classification Search
CPC .... H01M 10/482; H01M 10/486; H01M 2/10; H01M 10/6557; H01M 10/6555; H01M 10/613; H01M 10/63; H01M 10/647
See application file for complete search history.

(56) References Cited

U.S. PATENT DOCUMENTS

2009/0104512 A1*  4/2009  Fassnacht ........... H01M 2/0245
                                                         429/120
2013/0130074 A1*  5/2013  Timmons ............. B60L 3/0046
                                                         429/62
(Continued)

FOREIGN PATENT DOCUMENTS

DE    102010022908    12/2011
DE    102010055612    6/2012
(Continued)

OTHER PUBLICATIONS

International Search Report and Written Opinion for Application No. PCT/EP2014/072698 dated Jan. 30, 2015 (English Translation, 12 pages).

*Primary Examiner* — Amy Cohen Johnson
*Assistant Examiner* — Paul D Baillargeon
(74) *Attorney, Agent, or Firm* — Michael Best & Friedrich LLP

(57) ABSTRACT

The invention concerns a battery module (10, 72) consisting of a number of battery cells (12) electrically connected to one another by means of connectors (18). The battery module (10, 72) comprises a number of temperature sensors (20). The battery module (10, 72) comprises at least one intermediate cell (30) with an integrated temperature sensor system (36) comprising temperature sensors (20).

14 Claims, 6 Drawing Sheets

(51) Int. Cl.
    *H01M 10/6555*     (2014.01)
    *H01M 10/613*     (2014.01)
    *H01M 10/6557*     (2014.01)
    *H01M 10/48*     (2006.01)
    *H01M 2/10*     (2006.01)

(52) U.S. Cl.
    CPC ....... *H01M 10/486* (2013.01); *H01M 10/613* (2015.04); *H01M 10/647* (2015.04); *H01M 10/6555* (2015.04); *H01M 10/6557* (2015.04)

(56) References Cited

U.S. PATENT DOCUMENTS

| | | |
|---|---|---|
| 2013/0171491 A1 | 7/2013 | Wei et al. |
| 2013/0196196 A1 | 8/2013 | Obeidi et al. |

FOREIGN PATENT DOCUMENTS

| | | |
|---|---|---|
| DE | 102012220873 | 5/2013 |
| EP | 2479835 | 7/2012 |
| EP | 2637248 | 9/2013 |
| JP | 2009077420 A | 4/2009 |
| KR | 20120125002 A | 11/2012 |
| WO | 2012105160 | 8/2012 |

\* cited by examiner

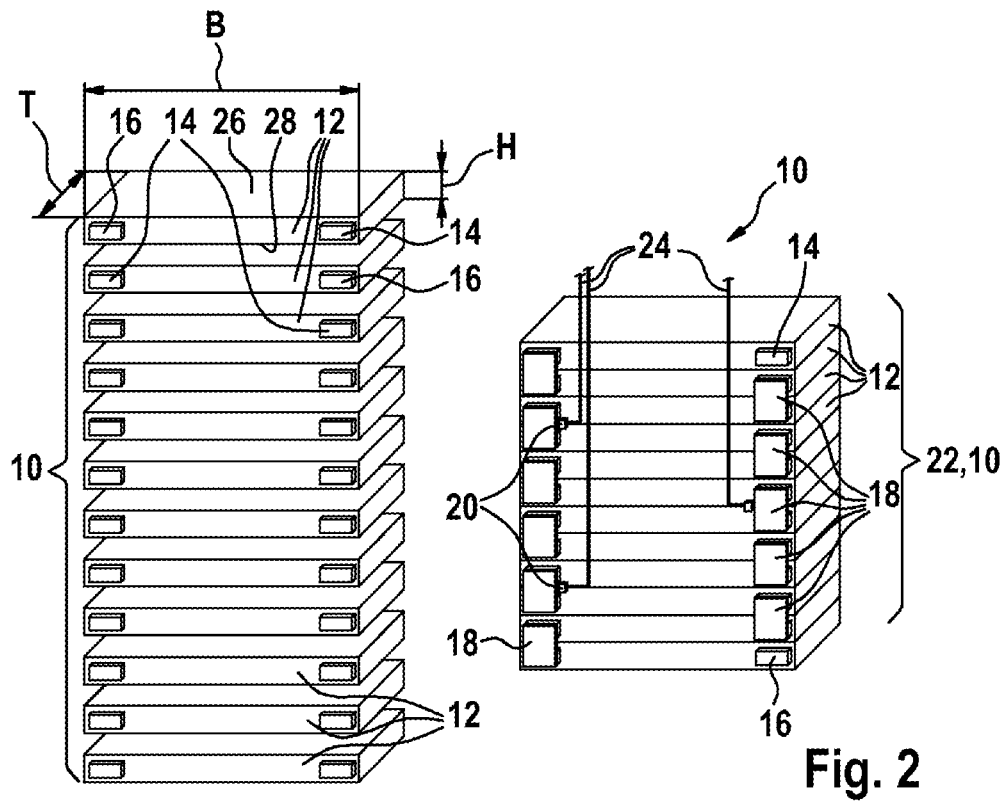
Fig. 1
Fig. 2
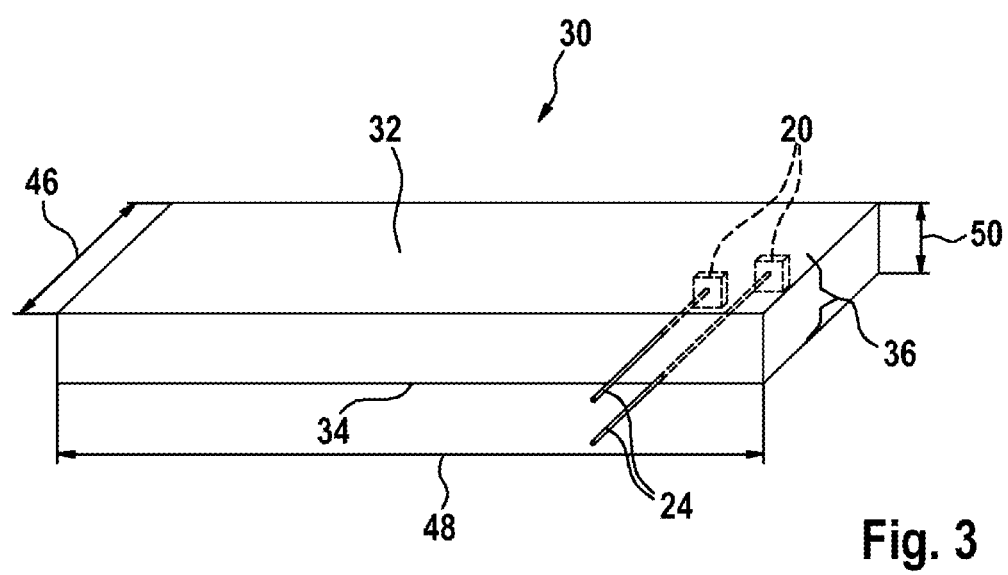
Fig. 3

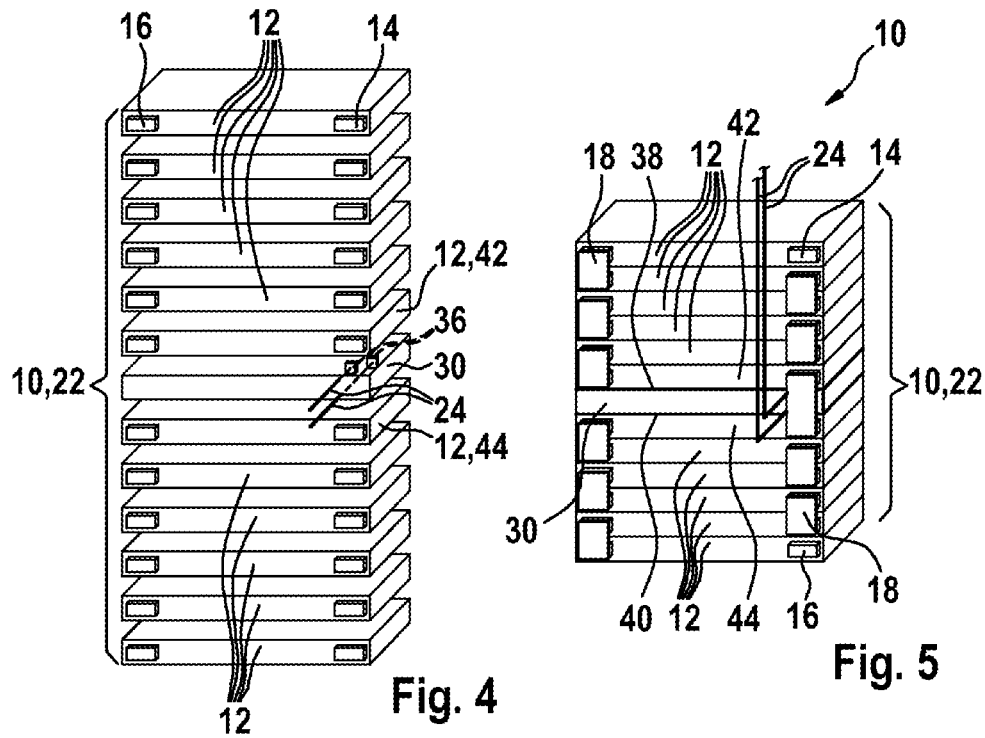
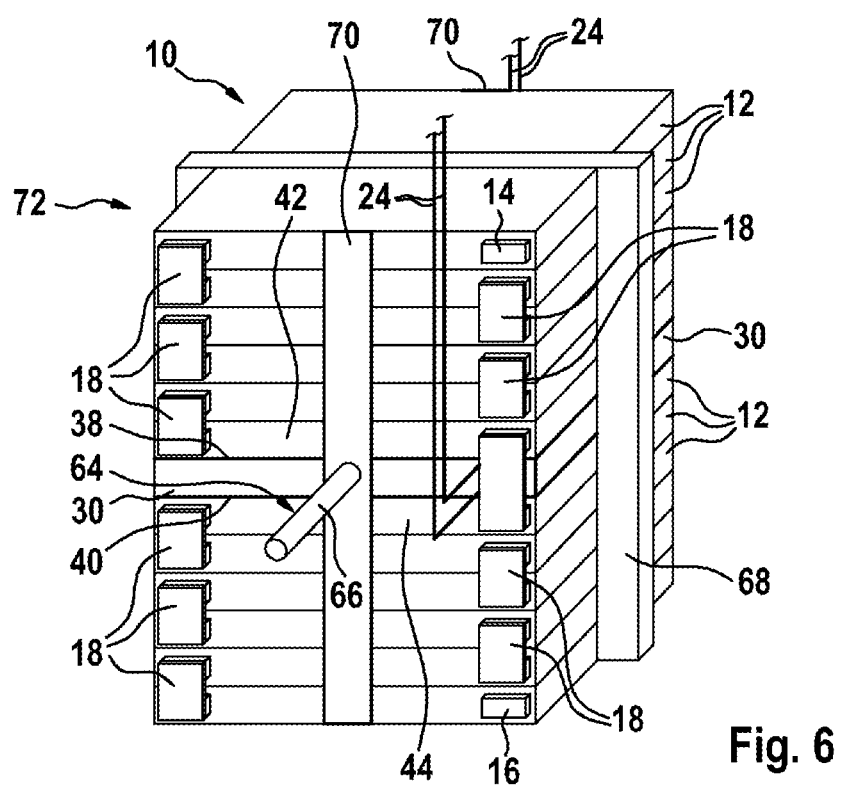

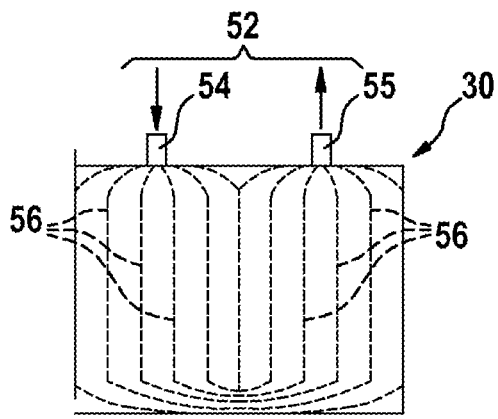
Fig. 7.1
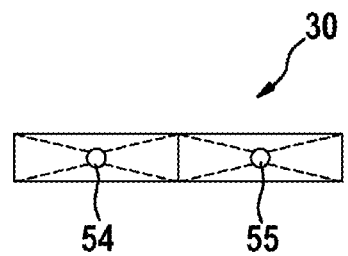
Fig. 7.2
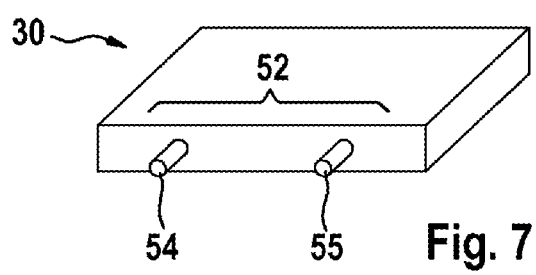
Fig. 7.3
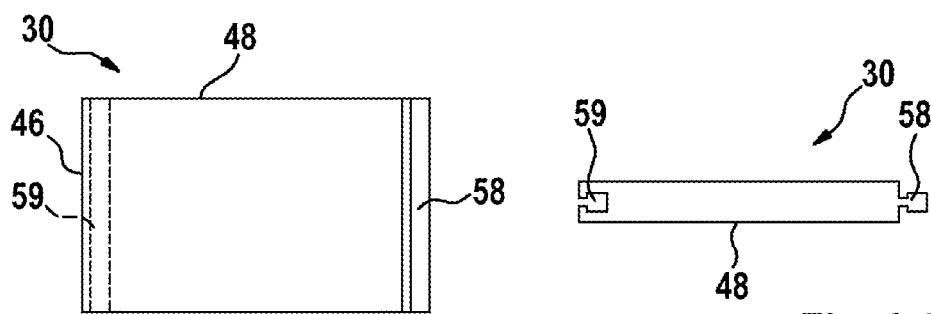
Fig. 8.1
Fig. 8.2
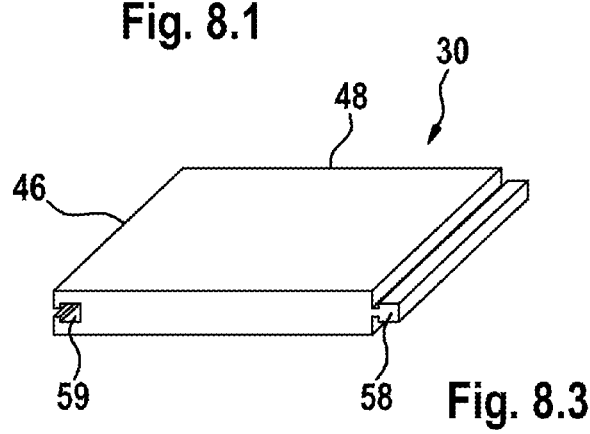
Fig. 8.3

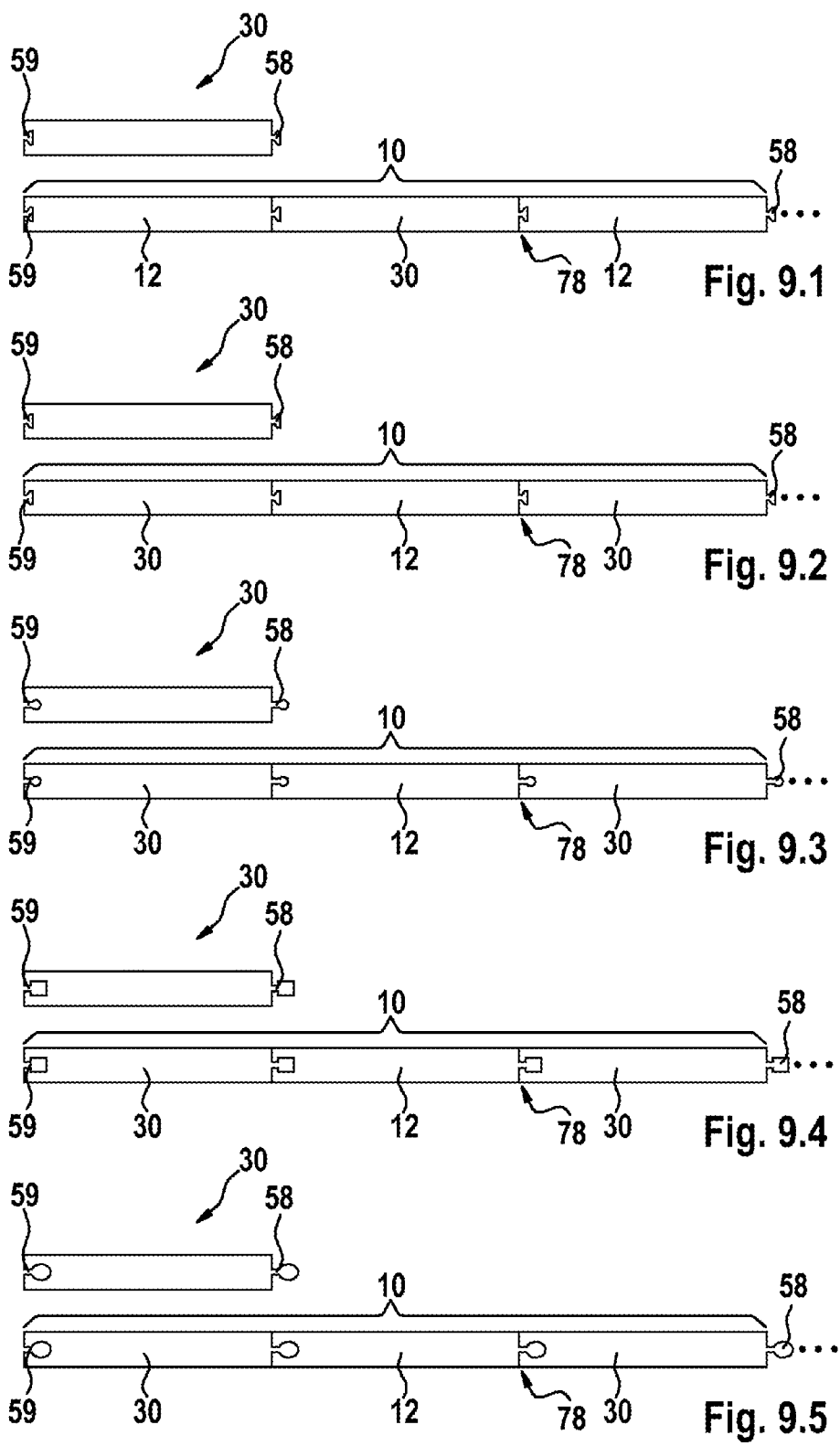

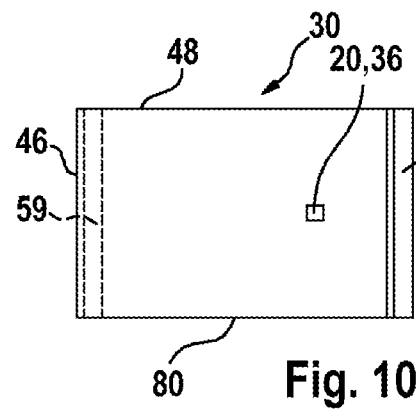
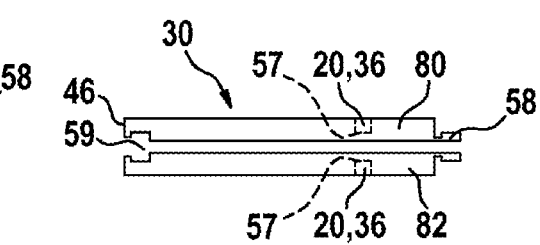
Fig. 10.1
Fig. 10.2
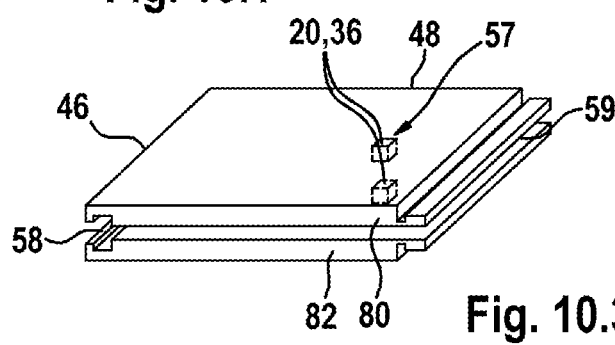
Fig. 10.3
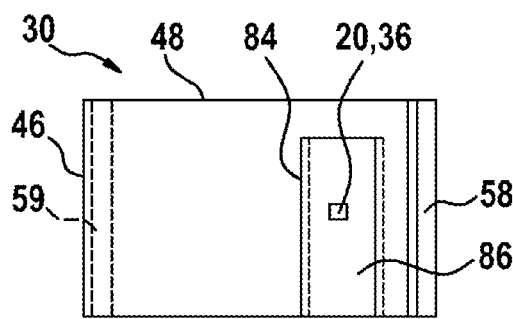
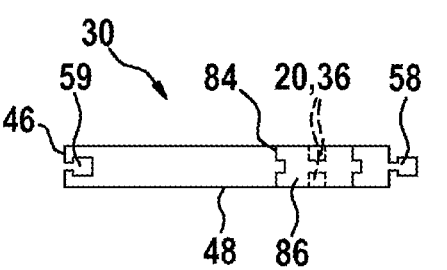
Fig. 11.1
Fig. 11.2
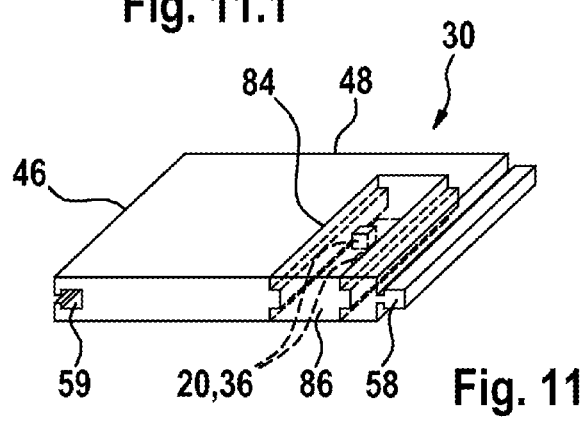
Fig. 11.3

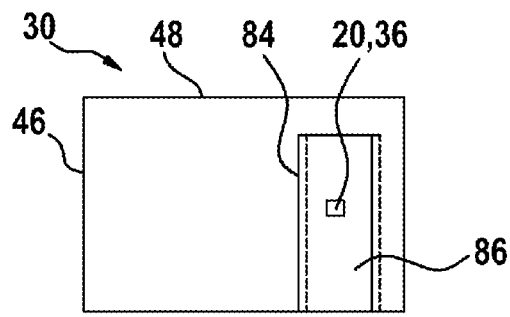
Fig. 12.1
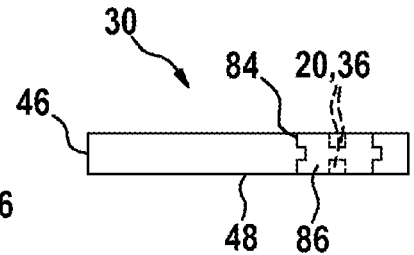
Fig. 12.2
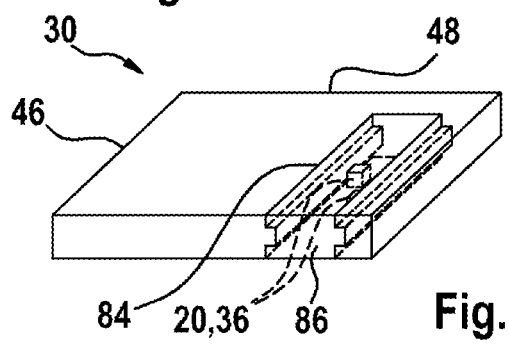
Fig. 12.3
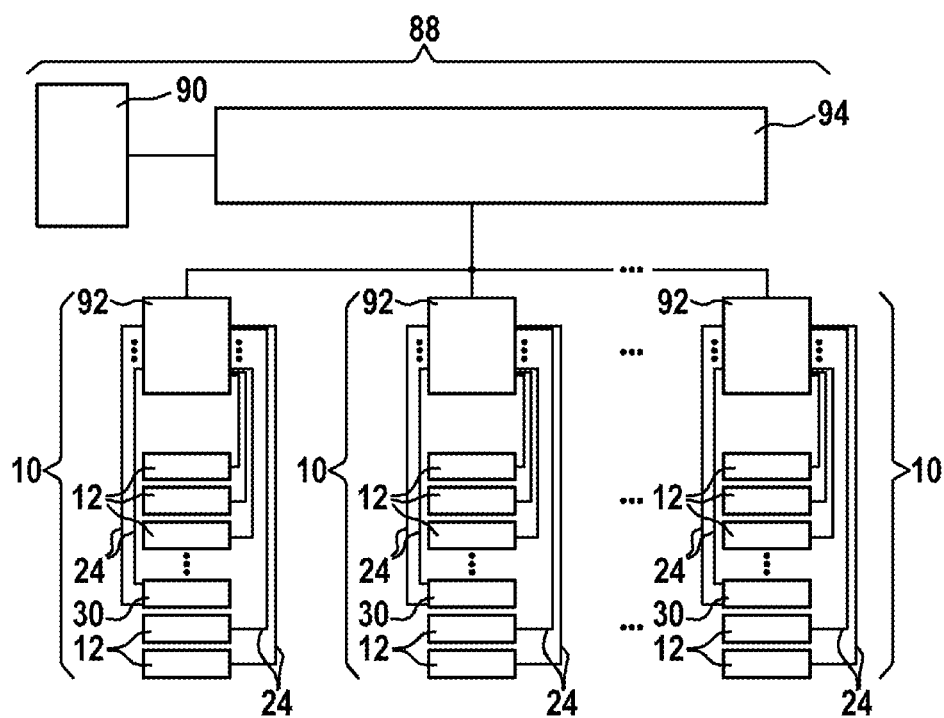
Fig. 13

BATTERY MODULE

BACKGROUND OF THE INVENTION

DE 10 2010 022 908 A1 relates to a battery with temperature detection and use of such a battery. The battery comprises a plurality of electrical flat cells which are connected to one another in parallel and/or in series. Said flat cells are arranged in rows one next to the other transversely with respect to their flat sides and form an essentially prismatic arrangement. In order to acquire more precise information about the state of the individual flat cells during the operation of the battery, and to be able to use said information, for example, for adapted temperature management, in each case a thermally connected heat dissipation plate, in which in each case at least one temperature sensor is integrated, is provided in the arrangement on at least one flat side of a plurality of the flat cells.

The heat dissipation plates can be fabricated, for example, from two parts, wherein depressions for accommodating the temperature sensors and the connecting line are provided in one part. The two parts of the heat dissipation plate are connected to one another via attachment means such as, for example, latching pins and corresponding latching openings. The heat dissipation plates can also be used to mechanically secure the battery cells, wherein the battery cell is connected to the plate, for example, by a screwed connection and/or a thermally conductive bonding. In a further embodiment there is provision for the heat dissipation plates to be connected to a cooling block. An air gap or a coolant passage can be provided between two battery cells.

US 2005/02106221 A1 discloses a method for manufacturing lithium polymer batteries with a high capacitance and a cooling system which is connected thereto. The cooling system comprises a multiplicity of pipes which run between the individual battery cells. The individual battery cells are assigned temperature sensors. The temperature sensors control a fan which drives an airflow through the pipes in order to cool the battery cells according to requirements.

DE 10 2010 055 612 A1 discloses a device for sensing the temperature of individual battery cells. The device serves to sense the temperature of individual battery cells which are connected to form a battery by means of current deflectors and/or bus bars. The device has temperature sensors which are arranged in the region of the individual battery cells. Furthermore, said device has a voltage-measuring means for each of the individual battery cells, which voltage-measuring means is in contact with, in each case, one of the electrodes of each of the individual battery cells via, in each case, one electrical contact. A temperature sensor is arranged on each of the electrical contacts.

Contemporary battery systems for electric vehicles and hybrid vehicles comprise prismatic, cylindrical or pouch secondary cells. The types of battery cell which are used for the most part nowadays generally have a connection to their housing or to their sleeve which leads the negative anode and the positive cathode of the secondary cell from the interior of the battery cell outside. Prismatic lithium secondary cells usually contain what are referred to as windings (jelly rolls) in which the anode, separator and cathode are introduced in a layered fashion and in a wound state into the housing of the battery cell. Contact is made metallically with the windings in the interior of the cells and, as already mentioned above, connections thereto lead out of the housing of the battery cell via connecting poles.

A plurality of battery cells can be connected in parallel in order to implement higher power or a higher energy content. This is done, for example, by using cell connectors with which a plurality of battery cells are connected electrically in parallel. The cell connectors are ultimately used to connect in serial fashion to one another the battery cells or groups of battery cells which are connected in parallel, in order to make available a sufficiently high voltage or a sufficiently high electrical power for the respective use.

A plurality of battery cells are generally combined to form one battery module. In a general case, the battery module comprises a module controller (CSC). The module controller (CSC) measures battery cell voltages and battery cell temperatures. A plurality of battery modules are in turn connected to one another to form a battery pack. This battery pack contains a battery control unit (BCU) which evaluates the data of the module controllers (CSC) and constitutes the communication interface with the vehicle.

Furthermore, relays, fuses, a cooling system, a degassing system, a low-voltage interface, various current-measuring entities and safety circuits are usually contained in the battery pack.

It is highly significant to sense as precisely as possible the temperatures which occur in the battery cells, since they constitute, together with the current and voltage, the most important safety-relevant measurement variables on the basis of which a battery management system regulates a battery pack and communicates with the vehicle. In the solutions which are known previously from the prior art, temperature sensors are generally attached to the cell connectors. This entails the disadvantage that the cell connectors, and also the cell terminals of the battery cells, can have a thermal capacity and a thermal resistance which is not negligible in certain cases, with the result that the temperature which is measured at the cell connector by the temperature sensors is a very imprecise representation of the actual temperature of the battery cell, a temperature profile can be represented only with a delay, and a considerably lower amplitude can result.

Applying temperature-measuring points directly to the housings of the battery cells constitutes a challenge in terms of production technology, and in addition the durability is significantly lower than in the case of a connection of the temperature sensors to the cell connector. This connection can be implemented, for example, by means of ultrasonic welding, but this is not possible on the housing of the battery cell which usually has a surface coating.

SUMMARY OF THE INVENTION

According to the invention, a mechanical place holder is provided in the battery module in which a temperature sensor system is installed. This provides the possibility of positioning the temperature sensors precisely at the critical locations within the battery module, with the result that the critical temperatures which occur are also measured in an unfalsified way, without distortion by extraneous influences, and are made available in the module controller (CSC), or in the battery management system.

In one preferred embodiment, the mechanical place holder, referred to below as an intermediate cell, is embodied with a geometry which preferably corresponds to the geometry of the individual battery cells, which are arranged, for example, in a layered structure and are embodied essentially as flat plates. As result, the intermediate cell can easily be integrated into a layered structure of battery cells which are of a flat design; furthermore, surface contact is produced between the intermediate cell, which accommodates the integrated temperature sensor system, and adjacent battery cells which are also of a flat design, with the result that good transmission of heat is ensured over a relatively large contact area. The term "battery cell which is of a flat design" is understood below to refer to a battery cell whose height is smaller by a multiple than its width and its depth.

In one embodiment of the intermediate cell proposed according to the invention with an integrated temperature sensor system, said intermediate cell can be fabricated in a half-shell design and comprise two half-shells which, after being equipped with the temperature sensor system, are joined to one another and which form the intermediate cell which is ready for installation.

Furthermore, there is the possibility of embodying the intermediate cell as a basic element which comprises an insert. A corresponding element which is equipped with temperature sensors can be inserted into the insert and, after the insertion, can be latched permanently in the basic element or secured therein in some other way. Finally, there is the possibility of embodying the intermediate cell as a solid component in which, for example, channels for the cabling and depressions for accommodating the temperature sensors are formed using metal-cutting methods. After the cable channels and the depressions for accommodating the temperature sensors have been formed, said temperature sensors are subsequently inserted into the solid body and covered.

If the intermediate cell which accommodates the integrated temperature sensor system is fabricated from solid material, or if said intermediate cell is embodied, for example, with a suitable mechanical structure, for example in the form of a honeycomb, the intermediate cell can withstand mechanical loading in a particularly advantageous way. Mechanical loading occurs, in particular, when the battery modules which comprise a number of battery cells are pressed or clamped one against the other during manufacture, which generally occurs as result of the attachment of a mechanical frame. The forces acting on the side walls of the battery cells are relatively high, with the result that an intermediate cell which is manufactured in the form of a honeycomb or from a solid material withstands the contact pressure and passes on the applied pressure homogeneously. As result of the clamping of the battery module, a particularly intimate surface contact is provided between the upper side and underside of the intermediate cell and the adjacent battery cells which bear thereon, with the result that excellent transmission of heat through thermal conduction is provided.

Owing to the fact that the intermediate cell can be integrated at any desired location of a layered structure of a battery module, there is the resulting possibility of installing the intermediate cell, which has the integrated temperature sensor system, at any desired location within the layered structure of the battery module, or of also accommodating a plurality of intermediate cells in the layered structure of the battery module. The integrated temperature sensor system has connecting lines which can be led laterally out of the intermediate cell which is, for example, of rectangular or square design, with the result that there is the possibility of connecting the at least one intermediate cell with an integrated temperature sensor system to the battery management system or to a module controller (CSC). The solution proposed according to the invention provides the great advantage of being able to measure the battery cell temperatures directly at the walls of the battery cells of battery cells which are adjacent to one another. When necessary, a plurality of the intermediate cells can also be installed in a battery module.

In a further very advantageous embodiment possibility of the solution proposed according to the invention, the intermediate cell comprises a cooling system and suitable connections to which a fluid-based coolant circuit can be connected. In order to perform particularly effective temperature control on the intermediate cell with a temperature sensor system which is integrated therein, the intermediate cell has a through-flow duct system which in fact comprises those connections for the fluid-based coolant circuit.

The intermediate cell which serves as a mechanical place holder with an integrated temperature sensor system can also be configured with additional retaining devices, as result of which a battery module which has at least one intermediate cell with these retaining devices can be mechanically connected in any desired form with other battery modules or other parts of a battery pack. It is therefore possible for the additional retaining devices to be embodied, for example, as clips, as eyelets, as screwed connections or as clamped connections. In addition, there is a possibility of also using connections which are embodied in a positively locking fashion, for example in the form of a dovetail or a dovetail connection, or similarly executed retaining devices.

A retaining device with which, for example, two complete battery modules which each have at least one intermediate cell can be connected to one another is provided, for example, by means of a threaded spindle or a threaded rod. For this purpose, for example a planar cooling device, which is embodied as a cooling plate, has a through-opening, just like the at least one intermediate cell. If the through-openings of the cooling plate which is of essentially flat design and the through-openings through the at least one intermediate cell in the layered structure of the battery module are aligned with one another, it is possible, by means of such a threaded rod or threaded spindle, to clamp to one another not only the battery cells and the at least one intermediate cell in a battery module but also the respective battery modules, each comprising at least one intermediate cell, to the cooling device which is of planar design. This makes it possible, in turn, to achieve a compact design of a pair of battery modules, which battery modules can in turn be, in pairs, part of a battery pack.

The solution proposed according to the invention provides the possibility of using the temperature sensor system at the critical locations of the battery module by means of a mechanical place holder in the form of an intermediate cell, with the result that the temperatures which occur at the critical locations of the housing of the battery cell can also be measured in an unfalsified way and transmitted onto the module controller (CSC) and/or the battery management system. The solution proposed according to the invention permits the temperatures to be measured directly at the walls of the battery cells of adjacent battery cells. By means of the solution proposed according to the invention there is also the possibility of installing a plurality of intermediate cells with an integrated temperature sensor system in a battery module, with the result that a multiplicity of temperature values for further processing can be transmitted to the module controller (CSC) or the battery management system, which considerably increases the informative power of calculations which are based on the battery cell-measuring temperatures. For reasons of redundancy, each of the intermediate cells with an integrated temperature sensor system can have a separate pair of connecting lines here, which connecting lines can each be connected independently of one another to the battery management system or to a module controller (CSC), with the result that the reliability of the temperature measurement of battery modules is considerably increased compared to solutions according to the prior art.

A further advantage of the solution proposed according to the invention is that when temperatures at cell connectors are measured in the case of high battery currents which occur there is the risk of the cell connectors heating to a very large extent owing to their electrical contact resistance with respect to the cell terminals. A temperature measured there then no longer corresponds to the cell temperature which is actually present in the interior of the battery cell. However, the battery management system or the module controller (CSC) interprets the temperatures measured there at the cell connector as a real battery cell temperature, which is too high in this case. In the worst case, the battery system can be switched off even though the cell temperature is actually correct and only the temperature of the cell connector may be too high on a local basis.

The solution proposed according to the invention can overcome this disadvantage by means of direct measurement of the relevant temperatures at the outer wall of the battery cells. Cell connection contact resistances therefore do not have any direct influence on the temperature which is determined.

A further advantage of the solution proposed according to the invention is that, for example, by means of a threaded rod or a retaining device which is embodied in some other way it is possible to bring about additional mechanical integrity which improves the stability with respect to mechanical vibrations and shocks such as can occur in a motor vehicle during operation, with the result that, considered overall, the safety of the battery pack with respect to damage is considerably improved.

BRIEF DESCRIPTION OF THE DRAWINGS

The invention will be explained in more detail below with reference to the drawings, in which:

FIG. 1 shows a design of a battery module composed of a plurality of individual battery cells which are of flat design and which each have a negative and a positive cell terminal, according to the prior art, FIG. 2 shows the clamped-together layered structure of a battery module, composed of battery cells whose negative and positive cell terminals are electrically connected to one another with cell connectors, according to the prior art, FIG. 3 shows a perspective view of a mechanical place holder in the form of an intermediate cell, FIG. 4 shows the arrangement of the mechanical place holder in the form of an intermediate cell according to FIG. 3 within a layered structure of a battery module, FIG. 5 shows the layered structure of the battery module with at least one intermediate cell according to FIG. 4 in an assembled, i.e. clamped-together, state, FIG. 6 shows two battery modules which are respectively clamped to one another by means of a retaining device and are supported on a common, flat cooling plate which is also penetrated by a retaining device which is embodied as a threaded rod, FIGS. 7.1, 7.2 and 7.3 show an intermediate cell with a through-flow duct system and connections for a cooling circuit, FIGS. 8.1, 8.2 and 8.3 show an intermediate cell according to the invention with a means of attaching to the next intermediate cell, FIGS. 9.1, 9.2, 9.3, 9.4 and 9.5 show intermediate cells with a variety of forms of means of attaching to the next battery cell and/or intermediate cell, FIGS. 10.1, 10.2 and 10.3 show an intermediate cell of a half-shell design with an integrated temperature sensor system, FIGS. 11.1, 11.2 and 11.3 show an intermediate cell according to the invention with an insert for an integrated sensor system, FIGS. 12.1, 12.2 and 12.3 show an intermediate cell without a means of attaching to the next battery cell or intermediate cell with an insert of temperature sensors and FIG. 13 shows a schematic design of a battery management system with module controllers (CSC) and battery modules, in each of which an intermediate cell according to the invention is accommodated.

DETAILED DESCRIPTION

FIG. 1 shows a battery module 10 which comprises a number of individual flat battery cells 12. Each of the flat battery cells 12 comprises a positive battery cell terminal 14 and a negative battery cell terminal 16. As is also apparent from FIG. 1, each of the flat battery cells 12 has an upper side 26 and an underside 28. The term "flat battery cell" is to be understood in the present context as being a battery cell 12 whose height H is smaller by a multiple compared with its width B and its depth T.

The individual flat battery cells 12 illustrated in FIG. 1 are joined, according to FIG. 2, to form a battery module 10 with a layered structure 22. If the individual flat battery cells 12, which are of essentially rectangular design in this embodiment variant bear one against the other, the positive and negative battery cell terminals 14 and 16 are electrically connected to one another by means of connectors 18. The compact layered structure 22 as illustrated in FIG. 2 is produced. In the illustration according to FIG. 2, temperature sensors 20 are arranged at the individual connectors 18, which respectively connect a positive battery cell terminal 14 and a negative battery cell terminal 16 to one another. The temperature sensors 20 are connected via connecting lines 24 to a battery management system (not illustrated in FIG. 2) or to a module controller (CSC) (not illustrated in FIG. 2). The disadvantage of the battery module 10 illustrated in FIGS. 1 and 2 is the fact that the connectors 18 and, from time to time, also the positive and negative battery cell terminals 14, 16 can have a thermal capacitance which is not negligible and a thermal resistance which is not negligible either, with the result that the temperatures measured by means of the temperature sensors 20 at the connector 18 reflect the actual temperature of the flat battery cells 12 only very imprecisely. This gives rise to imprecise values or to delayed values of the temperature display, which can have serious consequences.

Embodiment Variants

FIG. 3 shows the mechanical place holder proposed according to the invention in the form of an intermediate cell with an integrated temperature sensor system.

It is apparent from the perspective illustration according to FIG. 3 that a mechanical place holder, which is referred to below as intermediate cell 30, has an essentially rectangular appearance. The geometry of the intermediate cell 30 according to the perspective illustration in FIG. 3 preferably complies with the geometry of flat battery cells 12 which are installed in a battery module 10. If the battery module 10 is embodied in a rectangular shape essentially as a layered structure 22 composed of a multiplicity of flat battery cells 12, the intermediate cell 30 is preferably also embodied in a rectangular shape, with the result that it is inserted into the layered structure 22 of the battery module 10. A temperature sensor system 36 is integrated into the intermediate cell 30 with an upper side 32 and an underside 34, as is represented in perspective in the illustration according to FIG. 3. In the present case, the temperature sensor system 36 comprises two temperature sensors 20 which have at least a single connecting line 24 which is led out of the intermediate cell 30 on a longitudinal side of said intermediate cell which is of flat design. The integration of the temperature sensor system 36 into the body of the intermediate cell 30 can be carried out in various ways. A height 50 of the intermediate cell 30 corresponds essentially to the height H of the flat battery cell 12, the width 48 of the intermediate cell 30 corresponds essentially to the width B of the flat battery cell 12, and a depth 46 of the intermediate cell 30 corresponds essentially to the depth T of the flat battery cell 12.

The intermediate cell 30 which is represented in a perspective view in FIG. 3 can be represented by 2 half shells (cf. FIGS. 10.1 to 10.3) which are joined together after being equipped with temperature sensors 20. The connecting lines 24 of the individual temperature sensors 20 can be led laterally out of the intermediate cell 30 on the longitudinal side thereof. In addition, there is alternatively the possibility of constructing the intermediate cell 30 as a basic element which has an insert (cf. FIGS. 11.1 to 11.3). A matching corresponding element, equipped with temperature sensors 20 which form the integrated temperature sensor system 36, is inserted into this insert in a manner of a drawer. After the insertion of the corresponding element which is constructed in a way which is complementary to the insertion opening and provided with the temperature sensors 20, this inserted element can be permanently latched in the basic element of the intermediate cell 30 or can be secured in its inserted position in some other way. There is alternatively also the possibility of constructing the intermediate cell 30 as a solid body. Channels for the at least one connecting line 24 and depressions which serve to accommodate the temperature sensors 20 can be formed in said solid body, for example using metal-cutting methods. After the construction of the channels for the at least one connecting line 24 and corresponding depressions 57 (cf. FIG. 10.2) for accommodating the temperature sensors 20 the latter can be inserted into a solid body and closed off on the upper side, with the result that a planar surface of the solid body is produced. When the intermediate cell 30 is configured as a solid body, a through-flow duct system for controlling the temperature of the intermediate cell 30 can also be formed in the body, or connections for fluid-based coolant circuits can be provided on the short end sides or on the long end sides.

The intermediate cell 30 which is illustrated in a perspective view in FIG. 3 can also be provided with additional retaining devices. As a result, depending on the number of intermediate cells 30 which are installed in a battery module 10 for measuring critical temperatures, a battery module 10 of any desired form can be connected mechanically to other battery modules 10, 72 or parts of a battery pack. The additional retaining devices of the intermediate cell 30 which serves as a mechanical place holder with an integrated temperature sensor system 36 can be configured, for example, as clips, as eyelets or as screwed connections and clamped connections, with the result that an intermediate cell 30 can be connected mechanically to flat battery cells 12. Positively locking retaining devices, as shown in FIGS. 8.1 to 8.3, FIGS. 9.1 to 9.5, FIGS. 10.1 to 10.3 and FIGS. 11.1 to 11.3, are also possible.

FIG. 4 shows a layered structure of the battery module, comprising a plurality of battery cells of flat design and at least one intermediate cell which serves as a mechanical place holder with an integrated temperature sensor system.

FIG. 4 shows that in this embodiment variant an intermediate cell 30 is accommodated—as illustrated in perspective form in FIG. 3—in the layered structure 22 of the battery module 10. The intermediate cell 30 which is illustrated in FIG. 4 is constructed with a depth 46, a width 48 and a height 50 (cf. FIG. 3) which correspond to the geometry of the flat battery cells 12 inserted in the layered structure 22 according to the exploded illustration in FIG. 4. The at least one intermediate cell 30 which is installed in the battery module 10 and which has the integrated temperature sensor system 36 has two temperature sensors 20, the at least one connecting line 24 of which is led outward from the intermediate cell 30 in each case.

FIG. 5 shows the battery module according to FIG. 4 with a layered structure in the mounted state. From the illustration according to FIG. 5 it is apparent that the individual flat battery cells 12 which are of rectangular design bear one against the other with their upper sides and undersides 26, 28. The individual positive or negative battery cell terminals 14, 16 are connected electrically to one another with connectors 18.

The intermediate cell 30 is integrated in the center into the layered structure 22 of the battery module 10 according to the illustration in FIG. 5. The intermediate cell 30 bears with the upper side 32 (cf. FIG. 3) against a cell wall 38 of a first adjacent battery cell 42, and with the underside 34 (cf. FIG. 3) against a cell wall 40 of a second adjacent battery cell 44. This means that the intermediate cell 30, which is of rectangular design and serves as a mechanical place holder with an integrated temperature sensor system 36, has very good surface contact with the respectively adjacent battery cells 42 and 44, and the temperatures which are sensed by means of the integrated temperature sensor system 36 correspond to a large extent to the temperatures which are actually present in the adjacent battery cells 42 and 44.

The solution proposed according to the invention excludes the possibility of temperature measurement values being falsified by the thermal capacitances which are respectively inherent in the positive and negative battery cell terminals 14 and 16 or by the cell connectors 18 themselves owing to their thermal capacitance and their thermal resistance. Consequently, as result of the solution proposed according to the invention the true temperatures, which are measured—in the exemplary embodiment according to FIG. 5—by the intermediate cell 30 which is arranged in the layered structure 22 here, are fed in a nonfalsified form to the battery management system (cf. FIG. 13) or to the module controller (CSC) (cf. FIG. 13). The informative power of the temperature values which are picked up by the intermediate cell 30 is therefore considerably improved by the solution proposed according to the invention compared to solutions from the prior art.

The illustration according to FIG. 6 shows a combination of battery modules 10, 72 which are clamped to one another at a flat cooling element. It is apparent from the perspective illustration according to FIG. 6 that two battery modules 10, 72, which are embodied as a layered structure 22 according to FIG. 5 are clamped by means of a clamping device 64 to a cooling element which is of flat design and is embodied as a cooling plate 68. The clamping of the individual battery modules 10 and 72 by their planar sides against the cooling plate 68 is carried out by means of the clamping device 64 which comprises a threaded rod 66 in the embodiment variant according to FIG. 6. For this purpose, both the cooling plate 68 and the intermediate cells 30 of the two battery modules 10 and 72 which are clamped against the cooling plate 68 are provided with through-openings. The clamping device 64, for example the threaded rod 66, is pushed through these through-openings, and the two battery modules 10 and 72 are then clamped, by means of a mechanical interface 70—embodied as a clip-shaped element which engages over—against the cooling plate 68 with their longitudinal sides which respectively face said cooling plate 68. As result, a cooling effect can be achieved, since, for example, the cooling plate 68 can be provided with a through-flow duct system, just like the interior of the body of the intermediate cell 30. The illustration according to FIG. 6 illustrates a combination of two battery modules 10 and 72 which each have an intermediate cell 30 with an integrated temperature sensor system 36, which intermediate cells 30 are clamped against the cooling plate 68, which can be part of a fluid-based cooling circuit. The surface contact of the battery modules 10, 72 with the cooling plate 68 is improved by the clamping device 64, with the result that the conduction of heat increases.

The combination of a pair of battery modules 10 and 72 which is illustrated in the perspective view according to FIG. 6 can be in turn integrated into a battery pack, which can comprise a relatively large number of battery modules, and therefore constitutes a preliminary construction stage of a battery pack for use in a battery system, for example, for driving an electric vehicle or hybrid vehicle.

FIGS. 7.1 to 7.3 show the intermediate cell proposed according to the invention with a cooling system.

A cooling system 52 of the intermediate cell 30 comprises connections 54, 55 for a fluid-based cooling circuit. The interior of the intermediate cell 30 is provided with a duct system composed of ducts 56, through which system fluid, which is circulated within the fluid-based cooling circuit, flows and which discharges heat from the intermediate cell 30. Since said intermediate cell 30 is, as described above in relation to FIGS. 4, 5 and 6, is embedded in a layered structure 22, the heat of adjacent battery cells 42, 44 can be effectively discharged from the layered structure 22 by means of the cooling medium which circulates in the fluid-based cooling circuit. There is therefore an effective means of cooling the battery cells 12 which are arranged in the layered structure 22 and are of a flat design.

The view according to FIG. 7.2 shows that the connections 54, 55 are arranged on the longitudinal side of the intermediate cell 30, as is also apparent from the perspective plan view of the intermediate cell 30 according to FIG. 7.3.

Embodiment possibilities of additional retaining devices can be found in the sequence of FIGS. 8.1 to 8.3. The FIGS. 8.1, 8.2 and 8.3 show that the intermediate cell 30 is provided with additional retaining devices 58 and 59. The latter are located on the sides of the intermediate cell 30 which constitute the depth 46 and the width 48. The first retaining device 58 is configured here, for example, as a projection in the form of a pin which is configured in a square fashion and which corresponds to a matching corresponding element, i.e. a second retaining device 59, which is embodied in a complementary fashion with respect to the first retaining device 58. The intermediate cells 30 or even adjacent battery cells 12 which are of flat design can be coupled to one another in any desired sequence by means of the connecting elements which are embodied here as additional positively locking retaining devices in FIGS. 8.1 to 8.3.

FIGS. 9.1 to 9.5 show various embodiment possibilities of the additional retaining devices.

It is apparent from the illustration according to FIG. 9.1 that a battery module 10 which contains at least an intermediate cell 30 can be embodied with retaining devices 58, 59 which have, for example, a knob-like appearance. The same applies to the embodiment possibility of retaining devices 58, 59 for the manufacture of a battery module 10 according to FIG. 9.2. FIG. 9.2 illustrates a different sequence of flat battery cells 12 and of intermediate cells 30 compared to FIG. 9.1.

According to the embodiment variant which is illustrated in FIG. 9.3, the additional retaining devices 58 and 59 are embodied with an essentially circular contour. FIG. 9.4 shows retaining devices 58, 59 which are embodied in an essentially square shape, in complementary fashion to one another. The embodiment possibility of retaining devices 58, 59 which is illustrated in FIG. 9.5 is characterized by an oval cross section of the retaining device 58, 59. In addition to the embodiment possibility of additional retaining devices illustrated in the figure sequence of FIGS. 9.1 to FIG. 9.5 there are numerous refinements for connecting at least one intermediate cell 30 proposed according to the invention to flat battery cells 12 within the battery module 10. The retaining devices 58, 59 can be embodied, for example, as clips or as screwed/clamped connections. A jointless planar contact between intermediate cells 30 and flat battery cells 12 is characterized by the reference number 78 in FIGS. 9.1-9.5.

FIGS. 10.1 to 10.3 show an intermediate cell, proposed according to the invention, with a half-shell design. It is apparent from the illustration according to FIG. 10.1 that a first half-shell 80 of the intermediate cell 30 has a side which corresponds to the depth 46, and a side which corresponds to the width 48. For example, cf. illustration according to FIG. 10.2, a depression 57, in which a temperature sensor 20, which is part of the integrated sensor system 36, is let into, is integrated into the first half shell 80. According to FIG. 10.2, the first half-shell 80 and a further second half-shell 82 form the intermediate cell 30. On the two half-shells 80, 82, corresponding geometries for the additional retaining devices 58 and 59 are each formed on the side which constitutes the depth 46. The longitudinal profile of the two retaining devices 58 and 59, which are embodied on the side, forming the depth 46, of the intermediate cell 30 is apparent from the perspective view according to FIG. 10.3. Instead of the square geometry, illustrated in FIG. 10.3, of the first and second additional retaining devices 58 and 59, the retaining devices can also have any other desired geometry, for example the geometries illustrated in FIGS. 9.1 to 9.5.

FIGS. 11.1 to 11.3 show an intermediate cell which is proposed according to the invention and which contains an insert.

FIG. 11.1 shows that the intermediate cell 30 which is fabricated from a solid material here has a cavity 84. An insert 86, which is embodied in a complementary fashion with respect to the geometry of the cavity 84, is inserted into this cavity 84. In the insert 86 there is at least one temperature sensor 20 which is part of an integrated temperature sensor system 36. In the embodiment variant according to FIG. 11.1, there are also additional retaining devices 58, 59 on each of the short sides of the intermediate cell 30, which sides define the depth 46 of said intermediate cell 30.

FIG. 11.2 shows the side view of the intermediate cell 30 according to FIG. 11.1. It is apparent from FIG. 11.2 that the additional retaining devices 58, 59 are embodied here essentially with a quadratic geometry and there is the insert 86, slightly off-center of the intermediate cell 30. Said insert 86 can contain one or even more temperature sensors 20 which are each part of the integrated temperature sensor system 36.

FIG. 11.3 shows the perspective plan view of the intermediate cell 30 according to FIGS. 11.1 and 11.2. It is apparent from FIG. 11.3 that the insert 86, which is embodied in a complementary fashion with respect to the geometry of the cavity 84, does not penetrate the complete depth 46 of the intermediate cell 30 but instead can be inserted only partially into the intermediate cell 30 and can be latched there, for example, by means of a positively locking connection. Instead of the positively locking connection, other means of attachment are possible, for example a form fit, in order to attach the insert 86 in the cavity 84 of the intermediate cell 30.

FIGS. 12.1 to 12.3 show an intermediate cell 30, embodied with the depth 46 and a width 48. The intermediate cell 30 according to FIGS. 12.1 to 12.3 also comprises a cavity 84 which accommodates the insert 86. The latter comprises, as already described above in relation to FIGS. 11.1 to 11.3, at least one temperature sensor 20 which is part of an integrated temperature sensor system 36. The intermediate cell 30 according to the figure sequence of FIGS. 12.1 to 12.3 is embodied without additional retaining devices.

FIG. 13 shows the intermediate cell proposed according to the invention, integrated into a battery management system. A battery management system 88 comprises, in addition to a battery control unit (BCU), a number of module controllers (CSC) 92. The number of module controllers (CSC) 92 complies with the number of battery modules 10 to be monitored. The module controller (CSC) 92 controls the flat battery cells 12, arranged here, for example, with a layered structure. Each of the battery modules 10 comprises at least one intermediate cell 30 which is proposed according to the invention and serves as a mechanical place holder. The integrated temperature sensor system 36, comprising one or more temperature sensors 20, is connected with at least one connecting cable 24 to the module controller (CSC) 92. The same applies to the flat battery cells 12, which are each connected via connecting lines 24 to the module controller (CSC) 92. The module controllers (CSC) 92 themselves are connected to the battery control unit 94, to which additional electronic devices such as, for example, an additional current sensor 90 (illustrated in FIG. 13) can be assigned.

The components which are illustrated in the battery management system 88 according to FIG. 13 are indicated only schematically. There is therefore the possibility of accommodating a multiplicity of further components in the battery management system 88, depending on the expansion level.

What is claimed is:

1. A battery module (10, 72) having a number of battery cells (12) which are electrically connected to one another by connectors (18), wherein the battery module (10, 72) has at least one intermediate cell (30) with an integrated temperature sensor system (36) comprising temperature sensors (20) and a cooling system (52), wherein the geometry of the intermediate cell (30) corresponds to the geometry of each of the individual battery cells (12) which are arranged in a layered structure (22) in that a width dimension, a height dimension, and a length dimension of the intermediate cell (30) are respectively equivalent to a width dimension, a height dimension, and a length dimension of each of the individual battery cells (12), wherein the intermediate cell is arranged in the layered structure.

2. The battery module as claimed in claim 1, characterized in that within the layered structure (22) of the battery module (10) at least one intermediate cell (30) bears against cell walls (38, 40) of adjacent battery cells (42, 44).

3. The battery module as claimed in claim 1, characterized in that the intermediate cell (30) comprises half shells (80, 82) which, after being equipped with the temperature sensors (20), are joined together to form the intermediate cell (30).

4. The battery module as claimed in claim 1, characterized in that the intermediate cell (30) comprises a cavity (84) into which an insert (86), which is embodied in a complementary fashion, is inserted with the temperature sensor system (36) and secured.

5. The battery module as claimed in claim 1, characterized in that the intermediate cell (30) is a solid component in which channels (56) and depressions (57) for accommodating the temperature sensors (20) are formed.

6. The battery module as claimed in claim 1, characterized in that connecting lines (24) of the integrated temperature sensor system (36) of the intermediate cell (30) are connected to a battery management system (88) and/or to a module controller (92) (CSC).

7. The battery module as claimed in claim 2, characterized in that the battery cells (12) are clamped against one another with a clamping device (64) in the layered structure (22).

8. The battery module as claimed in claim 7, characterized in that the clamping device (64) comprises a threaded spindle or a threaded rod (66).

9. The battery module as claimed in claim 1, characterized in that at least one intermediate cell (30) comprises a cooling system (52) and connections (54, 55) for a fluid-based cooling circuit.

10. The battery module as claimed in claim 1, characterized in that the intermediate cell (30) comprises a duct system (56) through which a cooling medium flows.

11. The battery module as claimed in claim 1, characterized in that the intermediate cell (30) comprises additional retaining devices (58, 59) for connecting to battery cells (12) within a battery module (72).

12. A combination comprising battery modules (10, 72) as claimed in claim 1, characterized in that a cooling plate, which makes contact with cell walls (38, 40) of flat battery cells (12), is arranged between the battery modules (10, 72).

13. The battery module as claimed in claim 1, wherein the cooling system includes a duct system which is positioned within the intermediate cell and through which a cooling medium flows.

14. The battery module as claimed in claim 1, wherein the intermediate cell (30) comprises a cavity (84) into which an insert (86), which is embodied in a complementary fashion, is inserted and secured, wherein the insert includes the temperature sensor system (36).

* * * * *